Dec. 20, 1960 D. H. STASSFORT 2,965,471
METHOD AND APPARATUS FOR PRODUCING MIXED FERTILIZERS
Filed April 1, 1955

DERRICK H. STASSFORT
INVENTOR.

BY R. L. Story

ATTORNEY

United States Patent Office 2,965,471
Patented Dec. 20, 1960

2,965,471

METHOD AND APPARATUS FOR PRODUCING MIXED FERTILIZERS

Derrick H. Stassfort, Calumet City, Ill., assignor to Swift & Company, Chicago, Ill., a corporation of Illinois Filed Apr. 1, 1955, Ser. No. 498,567

9 Claims. (Cl. 71—61)

This invention relates to a method and apparatus for the production of fertilizers. More specifically, the invention relates to a method and apparatus by means of which concentrated acids and alkalis may be mixed and reacted to form certain fertilizer salts which in turn may be directly and easily admixed to other fertilizer solid materials.

As a general rule, when salts such as ammonium sulphate and ammonium phosphate are prepared for use in fertilizer mixtures, they are formed in a vessel remote from the mixer containing the other fertilizer ingredients. Usually aqua ammonia solutions containing 30–40% $NH_3$ and dilute acids containing approximately 75–80% acid are employed. The water is necessary to absorb excess heat and to keep the salt product in solution. Were the salt to crystallize out, it would soon plug up the reactor, transmission lines, etc.

It has been proposed as an alternative to spray streams of sulphuric or phosphoric acid and anhydrous ammonia directly into a bed of mixing fertilizer ingredients. This is termed "in situ" ammonium salt formation. Thus, the necessity for the presence of excess water is largely eliminated making possible accurate control of the granulation operation, product moisture content and eliminating clogging of feed conduits, etc. However, this method has its shortcomings. Strong acids, such as sulphuric and phosphoric, attack several of the commonly used fertilizer ingredients, especially potassium chloride (potash), sodium nitrate and ammonium nitrate. Furthermore, when anhydrous ammonia is freely sprayed into a large mixing chamber and its union with sulphuric acid effected, there is often a large loss of ammonia. Finally, continued injection of substantial quantities of concentrated acid may result in corrosion of the internal walls of the mixing shell.

It is therefore an object of this invention to provide a method and apparatus for the production of fertilizer salts by the reaction of acids and alkalis, all of which are utilized in a concentrated condition.

It is a further object of this invention to provide an apparatus and method whereby anhydrous ammonia and a strong acid may be directly reacted thereby eliminating the necessity for excess water and simultaneously securing substantially complete absorption of the ammonia.

Still another object of this invention is to provide a method and apparatus which enables the use of large quantities of concentrated reactants but, at the same time eliminates the problems presented by the salting out ordinarily encountered where ammonium salts are prepared in the absence of substantial quantities of water.

A final object of this invention is to provide an apparatus and method which eliminates contact of strongly acidic substances with easily decomposed fertilizer salts as well as with any other substance found within a fertilizer mixing shell which is easily attacked by strong acids.

Further objects and advantages of this invention, if not specifically set out, will become apparent to one skilled in the art during the course of the following description.

Broadly, the present invention relates to a reaction chamber of relatively small size suitable for placement within a conventional fertilizer mixer at a point beneath the surface of the kiln roll of the solid materials. This reactor resembles an ordinary tin can or rectangular carton in that it is preferably somewhat elongated in shape and is provided with ends or caps. Here the resemblance ceases, however, each of the aforementioned caps has a hole, holes or some other orifice therein with conduits leading thereto. A longitudinal slot running the entire length of the unit is also provided. This slot serves as a discharge port for the materials forcing their way out of the reactor, while the perforated plates at either end serve as inlet means for the reactants. As stated above, suitable supply pipes or conduits are provided; these connect to sources of concentrated acid and liquid anhydrous ammonia. The unit is placed in position within the mixing chamber; acid and alkali are charged into it through the perforated plates and the two reactants combine with one another to form the desired ammonium salts. Because of the high degree of concentration of the reactants, very little water is present and because of the relatively small internal area of the unit, the reactants are thoroughly intermingled and substantially completely reacted with one another. The heat generated, of course, vaporizes and expands the incoming liquid anhydrous ammonia with the result that the solid or molten material formed is forcefully ejected into the midst of the other solid fertilizer materials within the mixer shell.

Figure 2:
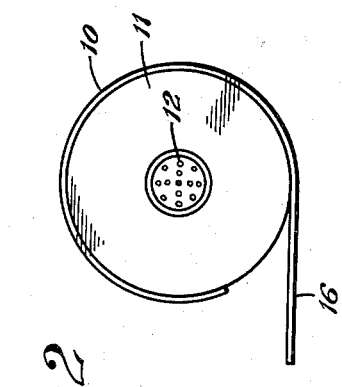
Figure 2 is an end elevational view of the reaction chamber of Figure 1.

Referring now to the drawings in which like characters refer to like parts throughout; a reaction vessel 10, preferably more or less cylindrical in shape, is provided with caps 11 at both ends. Orifice plates 12 are mounted in the previously mentioned caps at either end of the reaction chamber. Nipples or coupling members 13 and 14 provide communication with tubes or conduits leading to sources (not shown) of liquid anhydrous ammonia and concentrated mineral acid, either phosphoric or sulphuric. The reaction vessel has an open discharge slot 15 at the lower end thereof while protruding lip 16 extends beyond the outer perimeter of the reaction chamber and serves to deflect any dry solid materials away from the discharge slot.

Figure 3:
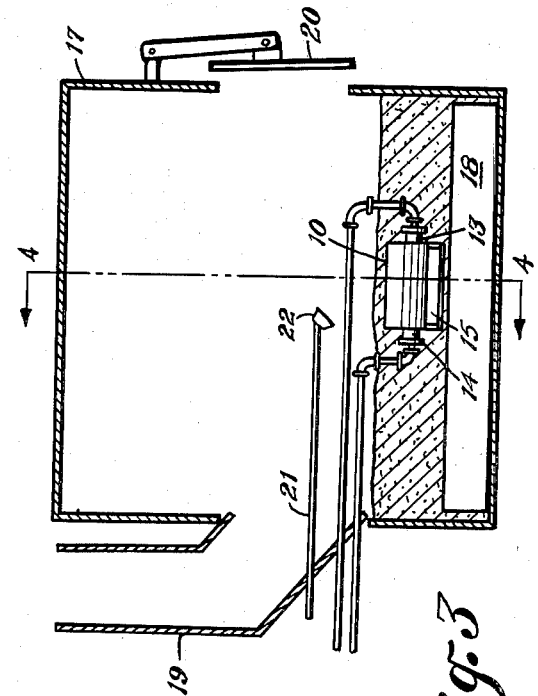
Figure 3 is a side elevational view partially in section showing the reaction chamber of Figure 1 positioned within a conventional fertilizer mixing shell.
Figure 1:
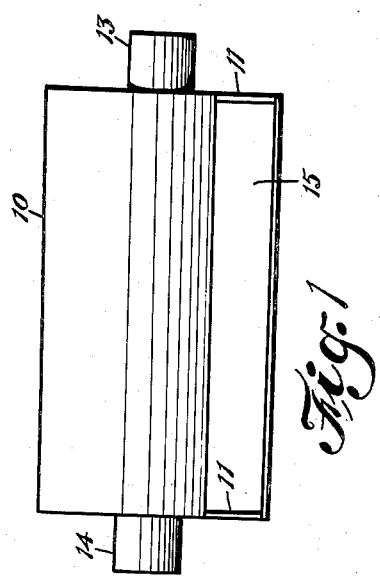
Figure 1 is a side elevational view showing the acid-alkali reaction vessel of this invention.
Figure 4:
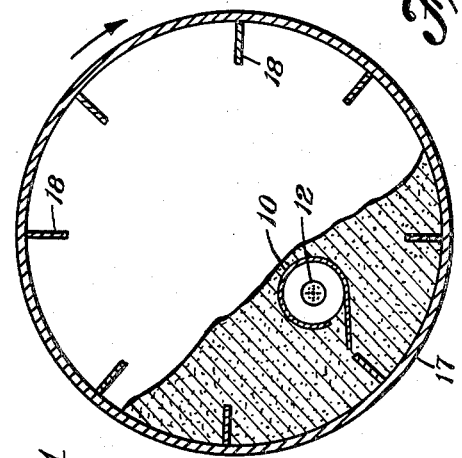
Figure 4 is an end view partially in section taken along the line 4—4 of Figure 3 showing the mixing shell and the reaction chamber mounted beneath the kiln roll of solid fertilizer materials.

Attention is directed to Figure 3. Here the chamber 10 is shown mounted beneath the kiln roll of solid fertilizer materials in a rotary fertilizer mixer 17, equipped with mixing flights 18, feed hopper 19 and a discharge opening ordinarily covered by plate 20. Preferably, a conduit 21 is provided having a spray head 22. This conduit is connected to a source of dilute ammoniating solution (an inexpensive source of nitrogen). Thus, ammoniation of superphosphates may conveniently be conducted during and following the neutralization reaction.

In operation, the reactor 10 is located slightly above the top of mixer flights 18 in the fertilizer mixer 17. Solid fertilizer material is fed into charging hopper 19 in sufficient quantity to insure that the reaction vessel 10 will be substantially entirely covered. In all events, it is desirable that the reaction vessel discharge port be covered.

Concentrated sulphuric or phosphoric acid is fed to vessel 10 from a source of one of these materials. The acid is channeled in through nipple 13 until it strikes orifice plate 12. The plurality of holes in the face of the orifice plate causes a spraying effect so that the strong acid is evenly distributed throughout the reaction chamber. Simultaneously, anhydrous ammonia is advanced from a source, not shown, through the other conduit communicating with nipple 14 mounted about the other perforated orifice plate. The alkali strikes the orifice plate forcefully and is thereby directed in fine sprays into the reaction chamber 10. Contact of the acid with the alkali results in a violently exothermic reaction with the result that the reaction product, an ammonium salt, is forced through discharge slot 15 directly into the fertilizer solids which comprise the kiln roll.

The heat generated is distributed throughout the mixing solids and any water which may be present is readily evaporated. Further, because of the small size of the reaction chamber, acid and alkali are thoroughly intermingled, with the result that virtually all ammonia is absorbed. However, any unreacted ammonia gas which escapes from the reactor is scrubbed out by the acid superphosphate materials present in the mixer. Thus, loss of ammonia, ordinarily a substantial problem in "in situ" ammonia salt production, is substantially eliminated.

Where it had previously been necessary to maintain at least 50% of the acid, either phosphoric or sulphuric, in an unreacted state prior to contacting it with the remaining fertilizer solids (where concentrated acids were employed) a much greater degree of neutralization of the acid is now possible. Heretofore, 50% neutralization had been the maximum if crystallizing out the salt was to be avoided. However, by employing the apparatus and method described above, concentrated acids may be virtually entirely neutralized with liquid anhydrous ammonia since it is unnecessary for the salt to be conveyed any substantial distance through narrow passages before it is brought into contact with the other fertilizer materials. As there are no lines or spray nozzles to plug up, there is no necessity for insuring complete dissolution of the salt at all times. In fact, because of the proximity of the reaction chamber to the fertilizer solids into which the newly formed acid-alkali salt is sprayed, such salt is in a molten condition when it strikes the solids. Thus, it is easily and completely dispersed throughout the solid mass. Finally, because the most active hydrogen atom of the acid, at least, is well neutralized, breakdown of fertilizer salts, such as potash, sodium nitrate, etc., is eliminated. The free unneutralized acid is allowed to strike only the walls of the reaction chamber 10, thus protecting the salts and the metallic surfaces of the rotary mixer.

The preferred shape for the reaction chamber 10 is, as indicated above, substantially cylindrical. However, this is not especially critical just as long as the reactor is properly mounted beneath the kiln roll. For example, the chamber could conceivably comprise two funnels joined at their points of maximum diameter and communicating with acid and alkali supplying means through conduits joined to the smaller ends. Also, a chamber square, rectangular or elliptical in cross section may be used. Similarly, the orifice plates described above are a preferred feature of the invention, but may be replaced with nozzles or other openings from the conduits to the chamber.

An example showing the use of the reaction chamber and associated apparatus of the invention is set forth below. This example appears purely for illustrative purposes and is not to be construed as placing limitations on the invention other than those set forth in the appended claims.

*Example*

Solid materials in the amounts set forth below were charged into a one-ton capacity rotary fertilizer mixing shell and mixed for about one minute.

| Ingredient | Ingredient Analysis, Percent | | Lbs. for 1 Ton Batch | Lbs. Water |
|---|---|---|---|---|
| | $H_2O$ | Plant Food | | |
| Step 1: | | | | |
| Triple Superphosphate | 5 | 45% $P_2O_5$ | 400 | 20.5 |
| Single Superphosphate | 7 | 18.5% $P_2O_5$ | 302 | 21.1 |
| Muriate of Potash | 0.2 | 60% $K_2O$ | 400 | .8 |
| Sulfate of Ammonia | 0.2 | 20.5% N | 355 | 0.7 |
| Step 2: | | | | |
| Anhydrous Ammonia | 0 | 82.25% N | 32 | 0 |
| 60° Bé. Sulfuric Acid | 22.33 | | 238 | 53.1 |
| Step 3: | | | | |
| Nitrogen Solution #3 | 18.2 | 40.8% N (Incl. 26% Free $NH_3$). | 348 | 63.3 |
| Totals | | | 2,084 | 159.5 |

This mixture of solids (Step 1) was tumbled for about one minute. Next, anhydrous ammonia (82.25% N) and 60° Bé. sulphuric acid (77.67% $H_2SO_4$) (Step 2) were contacted in a reaction vessel located beneath the kiln roll. These materials were, of course, injected under sufficient pressure to prevent interruption of smooth fluid flow because of pressures within the reaction chamber. The acid and ammonia were proportioned so that 238 pounds of sulphuric acid were commingled evenly with 32 pounds of anhydrous ammonia. As the sulphuric acid and ammonia reacted, the resulting molten ammonium acid sulfate ($NH_4HSO_4$) produced was sprayed into and dispersed throughout the tumbling solids.

Prior to completion of the neutralization reaction, injection of a nitrifying solution into the rotating shell was begun (Step 3). Ordinary commercially available nitrogen solution No. 3, an ammonia-ammonium nitrate containing 40.8% N, including 26% free $NH_3$ and 18.2% water served in this test.

Here 275 pounds of this nitrogen solution were used yielding a total formulation weight of 2,084 pounds of which 159.5 pounds were water. Approximately 80–85 pounds of this water were driven off by the heat of the neutralization reactions reducing the residual water content of the completed fertilizer to about 75 pounds or slightly less than 4%. The analysis of the product was approximately 12% N, 12% $P_2O_5$ and 12% $K_2O$. Thus, the product, while high in N, $P_2O_5$ and $K_2O$, was made in an inexpensive manner since low cost liquid nitrogen sources were largely used. The ammonia-ammonium nitrate solution furnished just sufficient free ammonia to complete the neutralization of the ammonium acid sulfate and ammoniate the superphosphate (the source of $P_2O_5$) to the extent of 58 pounds of free ammonia per ton of final mix. Beyond this point, substances containing $P_2O_5$ in a form available to plants undergo deleterious chemical reactions whereby highly insoluble tri-calcium phosphate and hydroxy-apatite are formed.

Similar tests employing B liquor (a 30% $NH_3$ solution) instead of anhydrous ammonia for partially neutralizing the sulfuric acid resulted in the production of a mixed goods containing an additional 71 pounds of water—or a total moisture content of 6½%. The product was not suitable for bagging and caked excessively.

It is seen, therefore, that by the use of this invention, it is possible to secure a mixed fertilizer product having carefully controlled amounts of water present and to eliminate the bulky reaction chambers, steam separators, etc., which are ordinarily required for the manufacture of acid salts. It is also possible to secure an ammonium salt in a non-solubilized state and at a point during fertilizer manufacture such that the problems usually presented by clogged pipes, spray nozzles, etc., are obviated.

Obviously, many modifications and variations of the invention as hereinbefore set forth may be made without departing from the spirit and scope thereof, and therefore only such limitations should be imposed as are indicated in the appended claims.

I claim:
1. In the process for the manufacture of mixed fertilizers the improvement which comprises: continuously passing streams of concentrated mineral acid and ammoniacal substances into a substantially enclosed reaction zone beneath the surface of a bed of fertilizer material; contacting said substances within said reaction zone whereby to react each with the other and to secure substantially complete absorption of said ammoniacal substance; allowing substantially the entirety of the heat and products formed by said reaction to immediately pass from said reaction zone to directly contact said fertilizer material; and admixing said reaction products with said fertilizer material whereby to obtain substantially complete absorption of any unreacted ammoniacal substance and to further dry said fertilizer material.

2. The process of claim 1 wherein the ammoniacal substance is anhydrous ammonia and the concentrated mineral acid is concentrated sulfuric acid.

3. The process of claim 1 wherein the ammoniacal substance is anhydrous ammonia and the concentrated mineral acid is concentrated phosphoric acid.

4. In the process for the manufacture of mixed fertilizers the improvement which comprises: injecting streams of anhydrous ammonia and concentrated mineral acid into a substantially enclosed reaction zone beneath the surface of a bed of fertilizer material; contacting said ammonia and acid within said reaction zone whereby to secure substantially complete absorption of said ammonia with the formation of an ammonium salt; vaporizing the incoming anhydrous ammonia with a portion of the heat so generated; admixing said ammonium salt and the remainder of the heat with said fertilizer material; and employing substantially the entirety of the remaining heat to further dry the fertilizer solid material.

5. Apparatus for the manufacture of mixed fertilizers comprising in combination with a fertilizer mixer: a reaction chamber mounted at a point within said mixer, said reaction chamber comprising a substantially entirely enclosed cylindrical chamber having a discharge port positioned longitudinally of the cylindrical surface, said port opening beneath the fertilizer solids in said mixer; a protruding lip-like guard member consisting of a portion of the cylinder wall in an outwardly straightened position disposed tangentially of said cylindrical chamber beneath said discharge port and spray injection means disposed in opposite ends of said chamber; and means for conveying liquid to said spray injection means.

6. Apparatus for the manufacture of mixed fertilizers comprising in combination with a fertilizer mixer: a reaction chamber mounted at a point within said mixer, said reaction chamber comprising a substantially entirely enclosed cylindrical chamber having a discharge port positioned longitudinally of the cylindrical surface, said port opening beneath the fertilizer solids in said mixer; a protruding lip-like guard member consisting of a portion of the cylinder wall in an outwardly straightened position disposed tangentially of said cylindrical chamber beneath said discharge port and spray injection means comprising a perforated core mounted in each of said closure members; and means for conveying liquid to each of said perforated cores.

7. In the manufacture of a mixed fertilizer, the process comprising: forming a rolling stream of fertilizer solids flowing in a given direction; at a point beneath the surface of said stream introducing a concentrated mineral acid into a substantially enclosed reaction zone and at a second point beneath the surface of said stream simultaneously introducing an ammoniacal substance into said substantially enclosed reaction zone whereby to at least partially neutralize said acid in said zone by the substantially complete absorption of said ammoniacal substance in order to form an acid salt and heat; and allowing substantially all of the heat and acid salt formed in said zone to pass immediately from said zone into said stream.

8. In the manufacture of a mixed fertilizer, the process comprising: forming a rolling stream of fertilizer solids flowing in a given direction; at a point beneath the surface of said stream introducing anhydrous ammonia into a substantially enclosed reaction zone and at a second point beneath the surface of said stream simultaneously introducing concentrated sulfuric acid into said substantially enclosed reaction zone whereby to at least partially neutralize said acid in said zone by the substantially complete absorption of said anhydrous ammonia in order to form ammonium acid sulfate and heat; and allowing substantially all of the heat and ammonium acid sulfate formed in said zone to pass immediately from said zone into said stream.

9. In the manufacture of a mixed fertilizer, the process comprising: forming a rolling stream of fertilizer solids flowing in a given direction; at a point beneath the surface of said stream introducing a concentrated mineral acid into a substantially enclosed reaction zone and at a second point beneath the surface of said stream simultaneously introducing anhydrous ammonia into said substantially enclosed reaction zone, whereby to at least partially neutralize said acid in said zone by the substantially complete absorption of said anhydrous ammonia in order to form an ammonium acid salt and heat; allowing substantially all the ammonium acid salt formed in said zone to pass immediately from said zone into said stream; vaporizing the anhydrous ammonia entering said zone with a portion of said heat produced by the reaction in said zone; and allowing substantially all the remainder of the heat to pass from said zone into said stream to dry the fertilizer solids in said stream.

References Cited in the file of this patent

UNITED STATES PATENTS

| | | |
|---|---|---|
| 1,872,024 | Bates | Aug. 16, 1932 |
| 2,035,981 | Richter | Mar. 31, 1936 |
| 2,047,393 | Siems | July 14, 1936 |
| 2,375,558 | Hutchinson | May 8, 1945 |
| 2,699,378 | Koelle | Jan. 11, 1955 |
| 2,729,554 | Nielsson | Jan. 3, 1956 |
| 2,755,176 | Pearce et al. | July 17, 1956 |

UNITED STATES PATENT OFFICE
CERTIFICATION OF CORRECTION

Patent No. 2,965,471                                              December 20, 1960

Derrick H. Stassfort

It is hereby certified that error appears in the above numbered patent requiring correction and that the said Letters Patent should read as corrected below.

Column 4, in the table, second column thereof, under the heading "$H_2O$", after each figure insert -- % --.

Signed and sealed this 1st day of August 1961.

(SEAL)
Attest:

ERNEST W. SWIDER                                            DAVID L. LADD

Attesting Officer                                                  Commissioner of Patents